(12) United States Patent
Velusamy et al.

(10) Patent No.: US 9,596,588 B1
(45) Date of Patent: Mar. 14, 2017

(54) CQI VERIFICATION FOR A ROAMING WCD

(71) Applicant: Sprint Communications Company L.P., Overland Park, KS (US)

(72) Inventors: Saravana Velusamy, Olathe, KS (US); Suryanarayanan Ramamurthy, Olathe, KS (US); Munawar Uddin, Naperville, IL (US); David Mohan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 644 days.

(21) Appl. No.: 14/090,306

(22) Filed: Nov. 26, 2013

(51) Int. Cl.
*H04W 8/04* (2009.01)
*H04W 28/18* (2009.01)
*H04W 8/18* (2009.01)

(52) U.S. Cl.
CPC .......... *H04W 8/04* (2013.01); *H04M 2215/34* (2013.01); *H04W 8/18* (2013.01); *H04W 28/18* (2013.01)

(58) Field of Classification Search
CPC ....... H04W 28/24; H04W 8/18; H04W 88/06; H04W 28/18; H04W 36/0044; H04W 4/24; H04W 8/04; H04M 15/8038; H04M 15/8016; H04M 2215/34; H04M 2215/7442; H04L 12/5695; H04L 47/805
USPC .................................. 455/432.1, 432.2, 434
See application file for complete search history.

(56) References Cited

U.S. PATENT DOCUMENTS

| | | | |
|---|---|---|---|
| 2006/0141995 A1* | 6/2006 | Purnadi ................. | H04L 63/102 455/414.1 |
| 2009/0213762 A1* | 8/2009 | Guo ...................... | H04W 68/12 370/254 |
| 2010/0074109 A1 | 3/2010 | Klingenbrunn et al. | |
| 2011/0310851 A1 | 12/2011 | Klingenbrunn et al. | |
| 2013/0095826 A1* | 4/2013 | Vrbaski ................... | H04W 8/12 455/432.3 |

* cited by examiner

*Primary Examiner* — Thai Vu (57) ABSTRACT

A Mobility Management Entity (MME) of a wireless network and verification method for verifying a Channel Quality Indicator (CQI) of a roaming Wireless Communication Device (WCD) are provided. The MME in one example includes an interface configured to receive a roaming request of the roaming WCD and a processing system coupled to the interface. The processing system is configured to obtain a home CQI of the roaming WCD, compare the home CQI to a contract-stipulated CQI for the roaming WCD, and use the contract-stipulated CQI for the roaming WCD if the home CQI differs from the contract-stipulated CQI.

18 Claims, 5 Drawing Sheets

CQI VERIFICATION FOR A ROAMING WCD

TECHNICAL BACKGROUND

A Wireless Communication Device (WCD) registered to one wireless network can enjoy increased mobility by roaming into other wireless networks. Roaming is facilitated by roaming agreements between wireless networks, wherein the WCDs of each wireless network are allowed to roam in the other networks. Such roaming agreements or contracts can stipulate the service levels that are to be granted to roaming WCDs.

A Channel Quality Indicator (CQI) in a Long Term Evolution (LTE) wireless network comprises a variable that can convey a level of service to be provided to a WCD. A CQI therefore can be used to determine what service levels to grant to roaming WCDs.

However, it is possible that a CQI of a roaming WCD can be incorrect. It is possible that the CQI can be out of date. It is even possible that the CQI be illegitimate. It is desired, therefore, that a wireless network not automatically accept a CQI value of a roaming WCD.

OVERVIEW

A Mobility Management Entity (MME) of a wireless network and verification method for verifying a Channel Quality Indicator (CQI) of a roaming Wireless Communication Device (WCD) are provided. The MME in one example includes an interface configured to receive a roaming request of the roaming WCD and a processing system coupled to the interface. The processing system is configured to obtain a home CQI of the roaming WCD, compare the home CQI to a contract-stipulated CQI for the roaming WCD, and use the contract-stipulated CQI for the roaming WCD if the home CQI differs from the contract-stipulated CQI.

DETAILED DESCRIPTION

Figure 1:
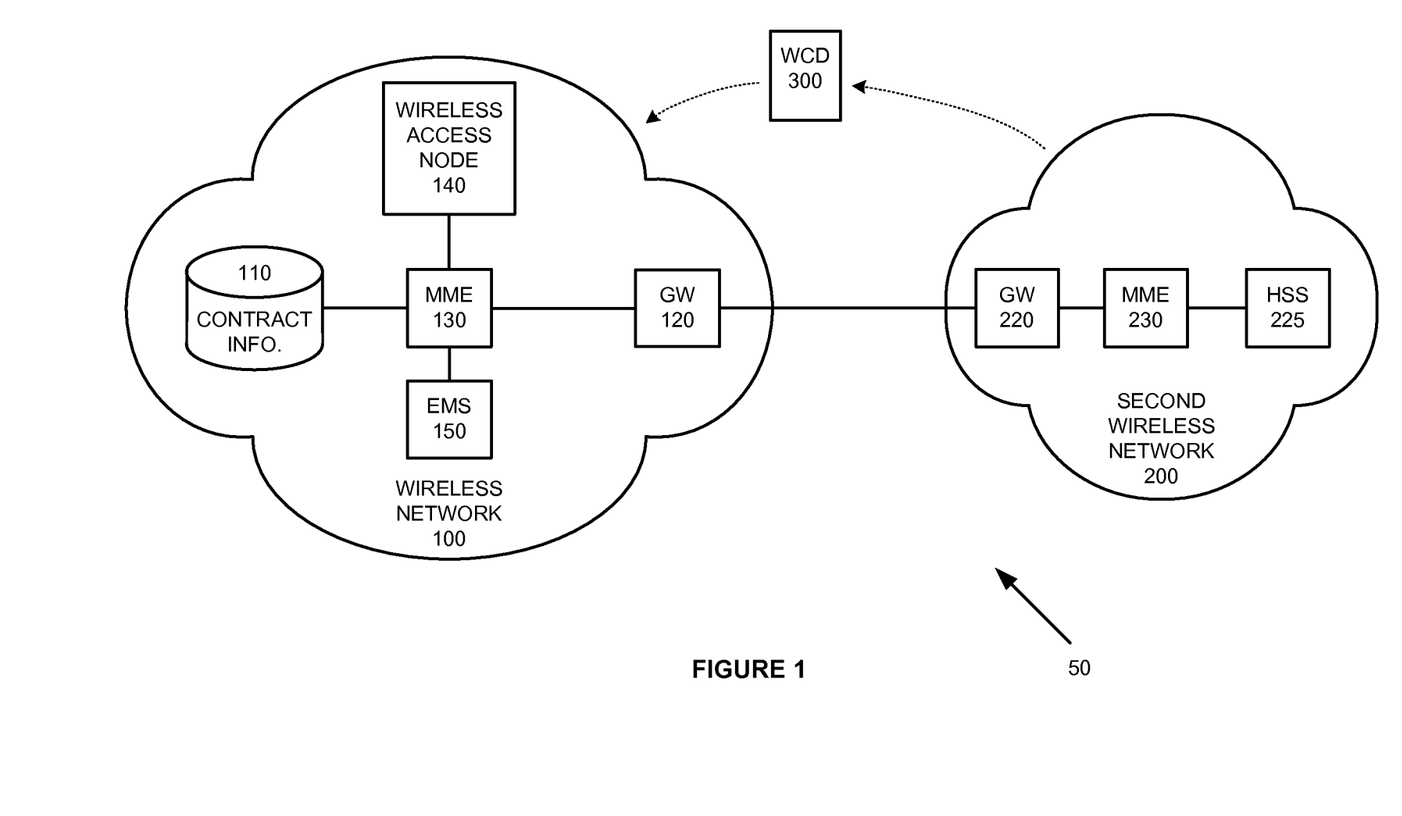
FIG. 1 shows an exemplary wireless roaming environment.

FIG. 1 shows an exemplary wireless roaming environment 50. The wireless roaming environment 50 in the example shown includes a wireless network 100, a second wireless network 200, and a Wireless Communication Device (WCD) 300. The WCD 300 is registered to the second wireless network 200 and the second wireless network 200 is therefore the home network of the WCD 300. The wireless network 100 includes one or more wireless access nodes 140, a Mobility Management Entity (MME) 130, at least one Gateway (GW) 120, a contract information storage 110, and an Element Management System (EMS) 150.

In the example shown, the WCD 300 is roaming away from the second wireless network 200. The WCD 300 sends a roaming request to the wireless network 100, requesting that the roaming WCD 300 be allowed to roam within the wireless network 100. The roaming request is received in a wireless access node 140 of the wireless network 100. In some examples, the wireless access node 140 comprises an enhanced Node B (eNB) 140. The wireless access node 140 passes the roaming request to the MME 130. Generally, the MME 130 performs functions such as determining where subscribers are so that communication services can be provided to the subscribers, wherever they are, as a location update procedure is performed by the WCD 300 whenever it moves from one location to the next. The WCD 300 provides a current location and a previous location to the MME 130, along with an identifier of the WCD. The MME 130 therefore determines the home network of the WCD 300, which is the second wireless network 200 in this example.

The MME 130 of the wireless network 100 can communicate with the second wireless network 200, including communicating with a second MME 230 of the second wireless network 200. The MME 130 of the wireless network 100 requests subscriber information from the second wireless network 200 regarding the roaming WCD 300. The communications pass through the gateways (GWs) 120 and 220. The subscriber information includes a Channel Quality Indicator (CQI) for the roaming WCD 300.

The CQI for the roaming WCD 300 (hereinafter the home CQI) is stored in a Home Subscriber Server (HSS) 225 of the second wireless network 200. The home CQI is obtained by the MME 130 from the HSS 225 of the second wireless network 200. The home CQI will typically be assigned to a subscriber based on a Quality of Service (QoS) requested by the subscriber. A subscriber can obtain a higher QoS, but typically will have to pay more to obtain a higher QoS.

The CQI typically comprises integer values from one to nine that reflect various factors that affect the QoS. The CQI includes transmission factors such as a resource type, a priority, a packet delay budget, and a packet error loss rate. Depending on a roaming agreement between a provider of the wireless network 100 and a provider of the second wireless network 200, the subscriber may be able to receive the same QoS while roaming in the wireless network 100. However, the wireless network 100 does not assume that a received roaming CQI for the roaming WCD 300 will necessarily be correct.

The contract-stipulated CQI for the roaming WCD 300 may not be the same as the home CQI that is available to the WCD 300 while operating at home within the second wireless network 200. Alternatively, the home CQI may be inaccurate. Further, the home CQI may be out of date. Moreover, the home CQI may have been spoofed or otherwise tampered with, especially where roaming security may not be as stringent as home security for the WCD 300.

The wireless network 100 in the example shown includes the contract information storage 110 that is accessible to the MME 130. The information storage 110 stores contract information including roaming contract information. The roaming contract information in some examples includes contract-stipulated CQI values for WCDs of other networks, such as for the WCDs of the second wireless network 200. The contract-stipulated CQI values specify QoS values to be used for roaming WCDs while roaming in the wireless network 100. A contract-stipulated CQI can be obtained by the MME 130 for the roaming WCD 300. The MME 130 can use a contract-stipulated CQI to verify a roaming CQI obtained from the second wireless network 200.

Figure 2:
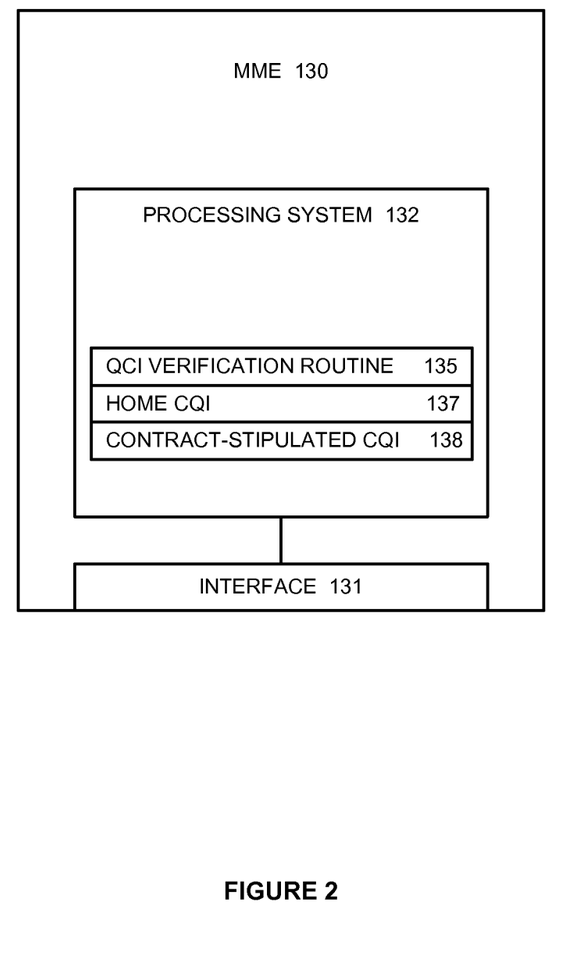
FIG. 2 shows an exemplary MME of a wireless network configured to verify a CQI of a roaming WCD.

FIG. 2 shows an exemplary MME 130 of the wireless network 100 configured to verify a CQI of the roaming WCD 300. The MME 130 in the example includes an interface 131 and a processing system 132 coupled to the interface 131. The interface 131 is configured to communicate with the roaming WCD 300, for example, and receive a roaming request of the roaming WCD 300, among other things.

The processing system 132 operates using software routines, operational values, and other data. The processing system 132 in the example shown includes a CQI verification routine 135, a home CQI 137, and a contract-stipulated CQI 138, among other things.

The CQI verification routine 135 receives the roaming request from the roaming WCD 300. The CQI verification routine 135 obtains a CQI for the roaming WCD 300 and verifies the roaming CQI.

The home CQI 137 comprises a CQI value obtained for the roaming WCD 300. The home CQI 137 is obtained from the home network of the roaming WCD 300, i.e., the second wireless network 200 in this example.

The contract-stipulated CQI 138 comprises a CQI value for the roaming WCD 300 that is stored within the wireless network 100. The contract-stipulated CQI 138 comprises an agreed-upon CQI value for the WCD 300 when the WCD 300 is roaming in the wireless network 100. The contract-stipulated CQI 138 may be the same as or different from the home CQI 137 of the WCD 300. The contract-stipulated CQI 138 comprises a value previously agreed-upon between the provider of the wireless network 100 and the provider of the second wireless network 200 in some examples.

In some examples, the CQI verification routine 135 when executed by the MME 130 in general or the processing system 132 in particular operates to direct the MME 130 or the processing system 132 to receive a roaming request of a roaming WCD 300, obtain a home CQI 137 of the roaming WCD 300, compare the home CQI 137 to a contract-stipulated CQI 138 for the roaming WCD 300, and if the home CQI 137 differs from the contract-stipulated CQI 138, use the contract-stipulated CQI 138 for the roaming WCD 300.

In some examples, the CQI verification routine 135 when executed by the MME 130 in general or the processing system 132 in particular operates to direct the MME 130 or the processing system 132 to receive a roaming request of a roaming WCD 300, obtain a home CQI 137 of the roaming WCD 300, compare the home CQI 137 to a contract-stipulated CQI 138 for the roaming WCD 300, if the home CQI 137 differs from the contract-stipulated CQI 138, transfer the contract-stipulated CQI 138 to the roaming WCD 300, and request that the roaming WCD 300 use the contract-stipulated CQI 138 while roaming in the wireless network 100.

In some examples, the MME 130 can optionally record the occurrence of a mis-match if a mis-match occurs between the home CQI and the contract-stipulated CQI. Further, the MME 130 can optionally inform an Element Management System (EMS) 150 of the wireless network of the occurrence of a mis-match between the home CQI and the contract-stipulated CQI.

Figure 3:
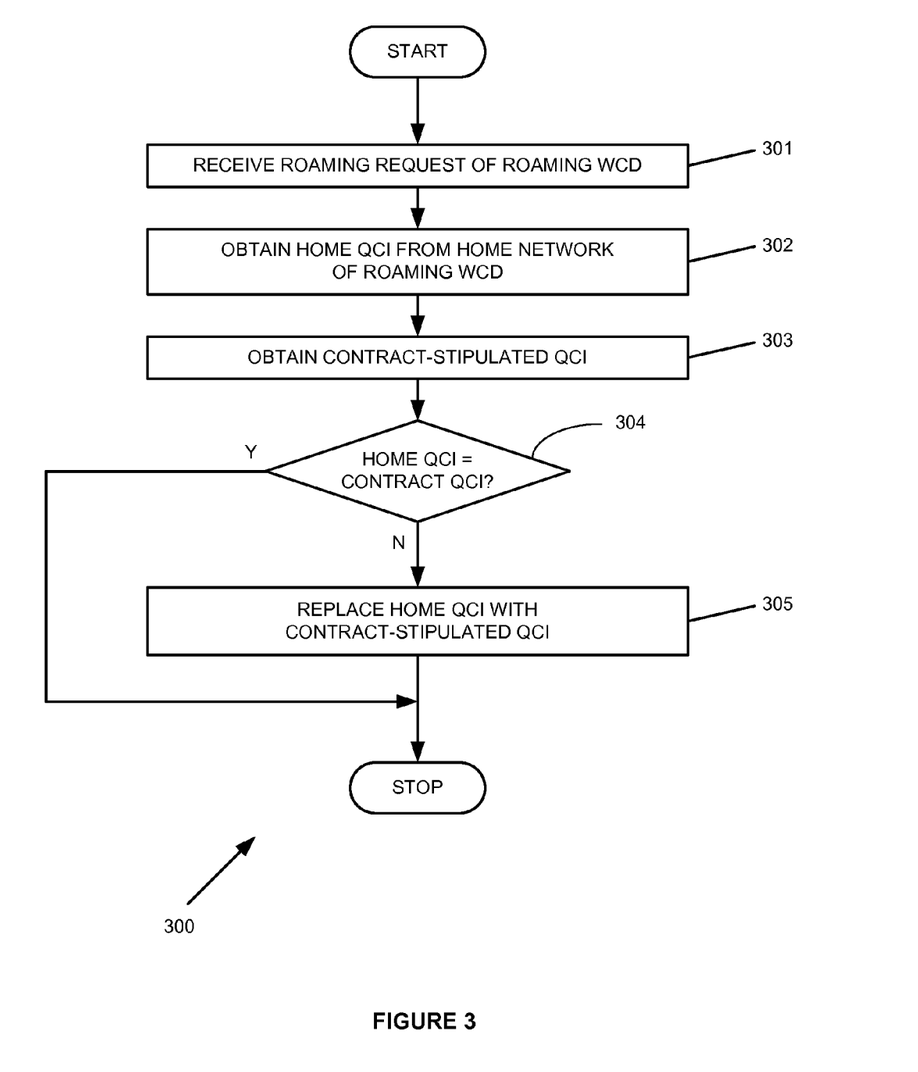
FIG. 3 is a flowchart of an exemplary CQI verification method for receiving a roaming WCD in a wireless network.

FIG. 3 is a flowchart 300 of an exemplary CQI verification method for receiving a roaming WCD in a wireless network. In step 301, a MME of the wireless network receives a roaming request of the roaming WCD, as previously discussed.

In step 302, the MME obtains a home CQI from a home wireless network of the roaming WCD, as previously discussed (i.e., the second wireless network in the examples). In some examples, the home CQI is received from a Home Subscriber Server (HSS) of the roaming WCD, wherein the HSS is a component or device of the second wireless network.

In step 303, the MME obtains a contract-stipulated CQI of the roaming WCD, as previously discussed.

In step 304, the MME compares the home CQI to the contract-stipulated CQI. If the home CQI and the contract-stipulated CQI are not equal, then the method proceeds to step 305. Otherwise, where the home CQI and the contract-stipulated CQI are equal, then the method exits and the home CQI is used by the MME and by the wireless network, as previously discussed.

In step 305, where the home CQI does not match the contract-stipulated CQI, then the home CQI is replaced with the contract-stipulated CQI. Consequently, the contract-stipulated CQI is used by the MME and by the wireless network for all communications that are exchanged with the roaming WCD.

In some examples, the MME can optionally record the occurrence of a mis-match if a mis-match occurs between the home CQI and the contract-stipulated CQI. Further, the MME can optionally inform an EMS of the wireless network of the occurrence of a mis-match between the home CQI and the contract-stipulated CQI.

Figure 4:
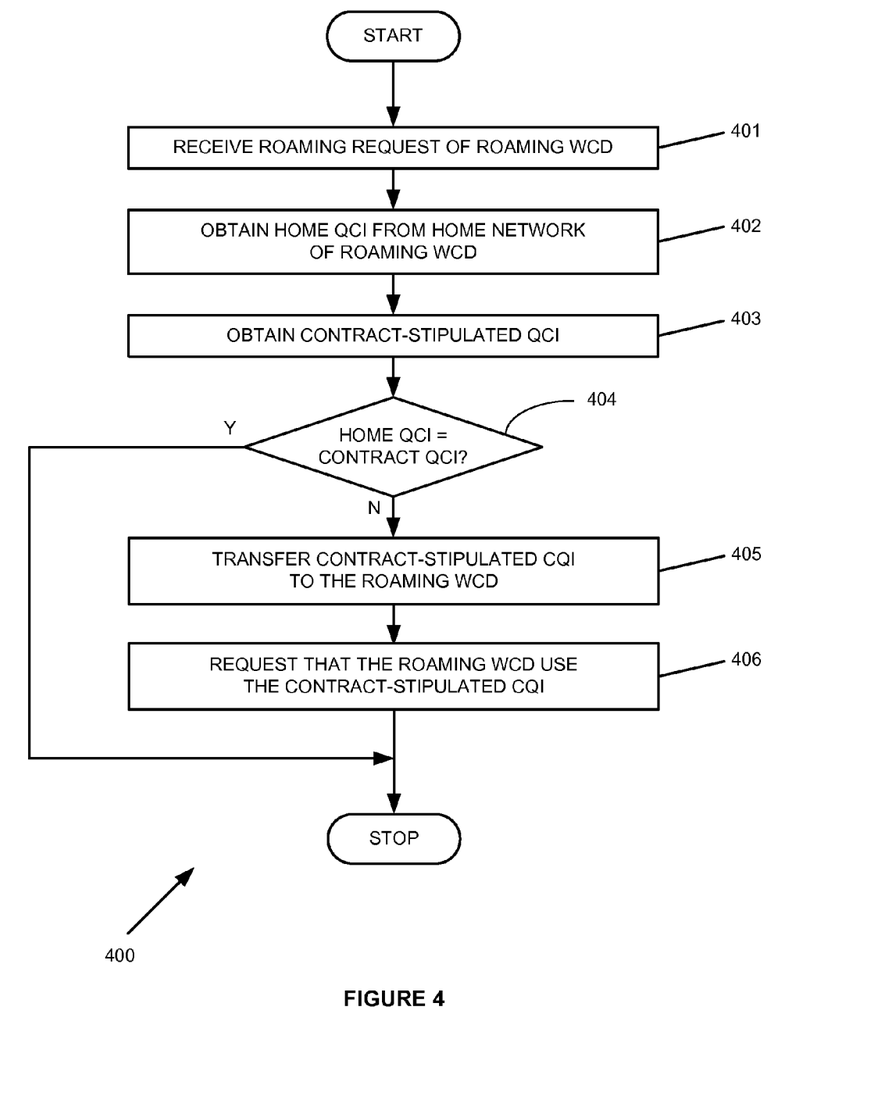
FIG. 4 is a flowchart of another exemplary CQI verification method.

FIG. 4 is a flowchart 400 of another exemplary CQI verification method. In step 401, a MME of the wireless network receives a roaming request of the roaming WCD, as previously discussed.

In step 402, the MME obtains a home CQI from a home wireless network of the roaming WCD, as previously discussed.

In step 403, the MME obtains a contract-stipulated CQI of the roaming WCD, as previously discussed.

In step 404, the MME compares the home CQI to the contract-stipulated CQI. If the home CQI and the contract-stipulated CQI are not equal, then the method proceeds to step 405. Otherwise, where the home CQI and the contract-stipulated CQI are equal, then the method exits and the home CQI is used by the MME and by the wireless network, as previously discussed.

In step 405, where the home CQI does not match the contract-stipulated CQI, the MME transfers the contract-stipulated CQI to the roaming WCD.

In step 406, where the home CQI does not match the contract-stipulated CQI, the MME requests that the roaming WCD use the contract-stipulated CQI. Consequently, the contract-stipulated CQI is used by the MME and by the wireless network for all communications that are exchanged with the roaming WCD.

In some examples, the MME can optionally record the occurrence of a mis-match if a mis-match occurs between the home CQI and the contract-stipulated CQI. Further, the MME can optionally inform an EMS of the wireless network of the occurrence of a mis-match between the home CQI and the contract-stipulated CQI.

Figure 5:
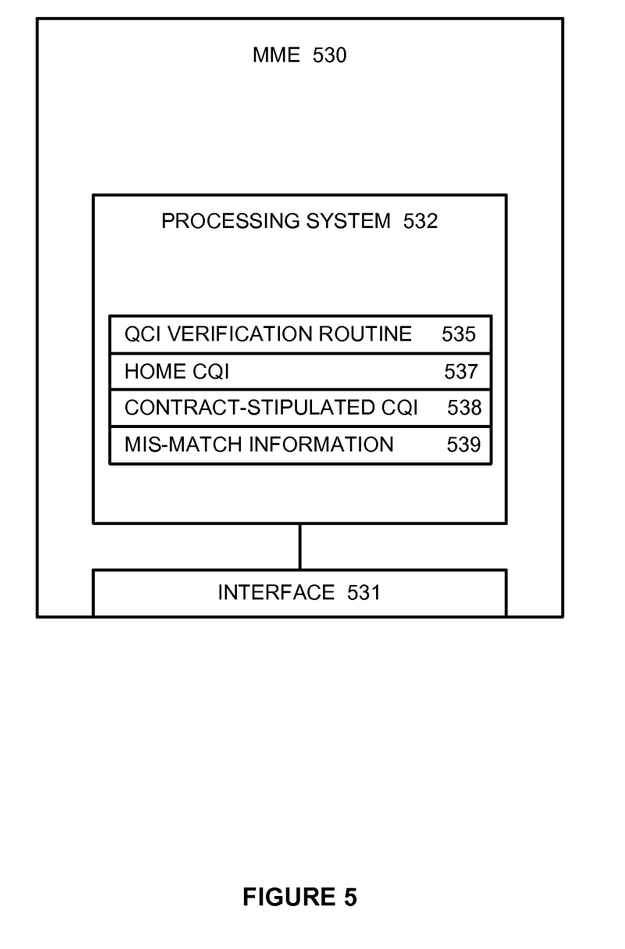
FIG. 5 shows another exemplary MME configured to verify a CQI of the roaming WCD.

FIG. 5 shows another exemplary MME 530 configured to verify a CQI of the roaming WCD 300. The MME 530 of FIG. 5 maybe the same as or different from the MME 130 of FIG. 2. In addition to the previously recited components and values, in this example the processing system 532 includes a mis-match information 539.

The mis-match information 539 stores occurrences of mis-matches between home CQIs and contract-stipulated CQIs. The mis-match information 539 can further store information about mis-match occurrences. The mis-match information 139 can store information about a mis-matched home CQI and a contract-stipulated CQI. The mis-match information 139 can store identification information for the WCD 300. The mis-match information 139 can store identification information for the second wireless network 200. The mis-match information 139 can store time and date information. Other mis-match information is contemplated and is within the scope of the description and claims.

The MME 530 can transfer the mis-match information 139 to other components and devices of the wireless network 100. In some examples, the MME 530 reports the mis-match information 139 to the EMS 150. Alternatively, or in addition, the MME 530 can report the mis-match information 139 to the second wireless network 200.

In some examples, the CQI verification routine 535 when executed by the MME 530 in general or the processing system 532 in particular operates to direct the MME 530 or the processing system 532 to receive a roaming request of a roaming WCD 300, obtain a home CQI 537 of the roaming WCD 300, compare the home CQI 537 to a contract-stipulated CQI 538 for the roaming WCD 300, and if the home CQI 537 differs from the contract-stipulated CQI 538, use the contract-stipulated CQI 538 for the roaming WCD 300.

In some examples, the CQI verification routine 535 when executed by the MME 530 in general or the processing system 532 in particular operates to direct the MME 530 or the processing system 532 to receive a roaming request of a roaming WCD 300, obtain a home CQI 537 of the roaming WCD 300, compare the home CQI 537 to a contract-stipulated CQI 538 for the roaming WCD 300, if the home CQI 537 differs from the contract-stipulated CQI 538, transfer the contract-stipulated CQI 538 to the roaming WCD 300, and request that the roaming WCD 300 use the contract-stipulated CQI 538 while roaming in the wireless network 100.

Referring to any of FIGS. 1 and 2, the wireless roaming environment in the examples can provide communication services including voice calls, text messages, data access, or other communication services provided over cellular or wireless communication networks. In some examples, the wireless roaming environment includes equipment to provide wireless access and communication services to user devices within different coverage areas, to route communications between content providers and user devices, and to facilitate handoffs between equipment of different coverage areas, among other operations.

The wireless roaming environment can include one or more wireless access nodes. The one or more wireless access nodes may be coupled together by communication links. The one or more wireless access nodes may be further coupled to other devices or networks, including telephone landlines or Internet links, for example. As a result, communications exchanged between the WCD and the wireless access node may be further provided to other devices within the wireless roaming environment.

Referring to any of FIGS. 1 and 2, the wireless roaming environment in some examples comprises a LTE, LTE Advanced, or Evolved Universal Terrestrial Radio Access (EUTRA) wireless network. However, other wireless networks are contemplated and are within the scope of the description and claims. Further, the examples above apply equally well to improvements and enhancements of current wireless networks.

Referring to any of FIGS. 1 and 2, the wireless access node in the examples includes processing equipment, routing equipment, physical structures, and can also include transceiver equipment, antenna equipment, and other equipment. The wireless access node includes at least one transceiver and antenna for exchanging wireless communications with the WCD in a particular sector of wireless coverage. It should be understood that the wireless access node could be distributed or consolidated among equipment or circuitry that together forms the elements of the wireless access node. Further equipment, networks, and systems can be communicatively coupled to the wireless access node, such as equipment, networks, and systems of cellular voice and data communication systems, but are omitted from the figures for clarity.

The wireless access node in the examples provides one or more wireless links in a cell or cell sector of wireless coverage in some examples. The wireless access node is capable of communicating with the WCD and may be capable of communicating using a variety of frequencies and a variety of communication schemes. A wireless access node can provide one or more wireless links in some embodiments. A wireless access node can provide a cell or sector of wireless coverage in some embodiments. Any number of wireless access nodes can be included in the wireless roaming environment.

The WCD and the wireless access node comprise communication circuitry and software to support one or more wireless protocols, such as LTE, CDMA, GSM, EVDO, and HSPA. The WCD and the wireless access node typically also comprise communication circuitry and software to support one or more data protocols, such as IP, Ethernet, packet voice, and the like. The wireless access node may have backhaul connectivity to one or more core networks over various wired and/or wireless data connections.

Referring to any of FIGS. 1 and 2, the WCD can comprise a mobile device, including a cellular phone, but also may include other devices. The WCD can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof. The WCD may be integrated within other systems and devices, such as vehicles, appliances, apparel, and the like. The WCD detects and reports various system conditions to the wireless access node, such as inter-cell interference and failed signaling access.

The WCD in the examples receives wireless access to communication services through the wireless access node. The communication services can include voice calls, text messaging, data exchange, multimedia streaming, and the like. The WCD can include one or more transceiver portions for communication over one or more wireless links of differing frequency bands. The WCD can receive wireless access information from one or more wireless access nodes, such as beacon signals, channel information, frequency information, overhead signaling, neighbor lists, and the like. The WCD can move among any of the coverage areas associated with the wireless roaming environment and receive wireless access.

Referring to any of FIGS. 1 and 2, the MME in the examples includes processing equipment, routing equipment, physical structures, and can also include transceiver equipment and other equipment. Further equipment, networks, and systems can be communicatively coupled to the MME, such as equipment, networks, and systems of cellular voice and data communication systems, but are omitted from the figures for clarity.

Referring to FIG. 2, the interface of the MME in the examples comprises a network card, network interface, port, or interface circuitry that allows the wireless access node to communicate with other communication devices over a variety of networks. The interface may also include a memory device, software, processing circuitry, or some other device. The interface may use various communication protocols, such as time division multiplex, internet, Ethernet, wireless, or some other communication format—including combinations thereof—to exchange communications as described herein for communication devices, such as anonymity factor and changes to the anonymity factor and mobility data.

The interface in the examples comprises an interface for communicating with one or more wireless access nodes and other components and devices of the wireless network. The interface exchanges authentication or authorization information with other wireless networks, provides parameters to one or more WCDs, and transfers communications for delivery to a WCD.

The processing system of the MME in the examples can comprise one or more microprocessors and other circuitry that retrieves and executes the CQI verification routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof. In some examples, the processing system includes a computer readable storage media capable of storing the CQI verification routine. The processing system can include volatile and nonvolatile, removable and non-removable media implemented in any method or technology for storage of information, such as computer readable instructions, data structures, program modules, or other data.

In addition to storage media, in the examples the processing system can also include communication media over which the CQI verification routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the CQI verification routine can, when loaded into the processing system and executed, transform the processing system into a special-purpose computing system configured to verify a CQI of a roaming WCD, among other operations. Encoding the CQI verification routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the CQI verification routine can transform the physical state of the semiconductor memory when the program is encoded therein. For example, the CQI verification routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The CQI verification routine in the examples comprises computer programs, firmware, or some other form of machine-readable processing instructions. The CQI verification routine may include an operating system, utilities, drivers, network interfaces, applications, virtual machines, or some other type of software. The CQI verification routine can include additional processes, programs, or components, such as operating system software, database software, or application software. The CQI verification routine can also comprise firmware or some other form of machine-readable processing instructions executable by the processing system.

The CQI verification routine in the examples can include additional processes, programs, or components, such as operating system software, database software, or application software. The CQI verification routine can also comprise firmware or some other form of machine-readable processing instructions executable by the processing system.

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A Mobility Management Entity (MME) of a wireless network configured to verify a Channel Quality Indicator (CQI) of a roaming Wireless Communication Device (WCD), comprising:
an interface configured to receive a roaming request of the roaming WCD; and
a processing system coupled to the interface, with the processing system configured to receive a roaming request of the roaming WCD, obtain a home CQI of the roaming WCD, compare the home CQI to a contract-stipulated CQI for the roaming WCD, use the contract-stipulated CQI for the roaming WCD if the home CQI differs from the contract-stipulated CQI, and inform an Element Management System (EMS) of the wireless network of the occurrence of a mis-match between the home CQI and the contract-stipulated CQI.

2. The MME of claim 1, with the processing system further configured to receive the roaming request of the roaming WCD via a wireless access node of the wireless network.

3. The MME of claim 1, with the processing system further configured to obtain the home CQI from a Home Subscriber Server (HSS) of a second wireless network through a second MME of the second wireless network.

4. The MME of claim 1, with the processing system further configured to contact the HSS through a second MME of a second wireless network, wherein the second wireless network has a roaming contract with the wireless network.

5. The MME of claim 1, with the processing system further configured to record the occurrence of a mis-match between the home CQI and the contract-stipulated CQI.

6. The MME of claim 1, with the processing system further configured to, if the home CQI differs from the contract-stipulated CQI, transfer the contract-stipulated CQI to the roaming WCD and request the roaming WCD use the contract-stipulated CQI while roaming in the wireless network.

7. A Channel Quality Indicator (CQI) verification method for receiving a roaming Wireless Communication Device (WCD) in a wireless network, comprising:
   in a Mobility Management Entity (MME) of the wireless network, receiving a roaming request of a roaming WCD;
   in the MME, obtaining a home CQI of the roaming WCD;
   in the MME, comparing the home CQI to a contract-stipulated CQI for the roaming WCD;
   in the MME, if the home CQI differs from the contract-stipulated CQI, using the contract-stipulated CQI for the roaming WCD; and
   in the MME, informing an Element Management System (EMS) of the wireless network of the occurrence of a mis-match between the home CQI and the contract-stipulated CQI.

8. The method of claim 7, with receiving the roaming request of the roaming WCD comprising receiving the roaming request via a wireless access node of the wireless network.

9. The method of claim 7, with obtaining the home CQI further comprising obtaining the home CQI from a Home Subscriber Server (HSS) of a second wireless network through a second MME of the second wireless network.

10. The method of claim 7, with the HSS being contacted through a second MME of a second wireless network, wherein the second wireless network has a roaming contract with the wireless network.

11. The method of claim 7, further comprising recording the occurrence of a mis-match between the home CQI and the contract-stipulated CQI.

12. The method of claim 7, wherein in the MME, if the home CQI differs from the contract-stipulated CQI, transferring the contract-stipulated CQI to the roaming WCD and requesting the roaming WCD use the contract-stipulated CQI while roaming in the wireless network.

13. A Channel Quality Indicator (CQI) verification method for receiving a roaming Wireless Communication Device (WCD) in a wireless network, comprising:
   in a Mobility Management Entity (MME) of the wireless network, receiving a roaming request of a roaming WCD;
   in the MME, obtaining a home CQI of the roaming WCD;
   in the MME, comparing the home CQI to a contract-stipulated CQI for the roaming WCD;
   in the MME, if the home CQI differs from the contract-stipulated CQI, transferring the contract-stipulated CQI to the roaming WCD; and
   in the MME, requesting that the roaming WCD use the contract-stipulated CQI while roaming in the wireless network.

14. The method of claim 13, with receiving the roaming request of the roaming WCD comprising receiving the roaming request via a wireless access node of the wireless network.

15. The method of claim 13, with obtaining the home CQI further comprising obtaining the home CQI from a Home Subscriber Server (HSS) of a second wireless network through a second MME of the second wireless network.

16. The method of claim 13, with the HSS being contacted through a second MME of a second wireless network, wherein the second wireless network has a roaming contract with the wireless network.

17. The method of claim 13, further comprising recording the occurrence of a mis-match between the home CQI and the contract-stipulated CQI.

18. The method of claim 13, further comprising informing an Element Management System (EMS) of the wireless network of the occurrence of a mis-match between the home CQI and the contract-stipulated CQI.

* * * * *